United States Patent [19]

Kirchhoff

[11] Patent Number: 4,906,485
[45] Date of Patent: Mar. 6, 1990

[54] METHOD FOR REHEATING OR COOKING FOODS USING A MIXTURE OF HEATED AIR AND WATER

[75] Inventor: Ernst Kirchhoff, Wunstorf, Fed. Rep. of Germany

[73] Assignee: Vaporina Back-Und Gefriergeraete GMBH, Ludwigsburg, Fed. Rep. of Germany

[21] Appl. No.: 79,757

[22] Filed: Jul. 30, 1987

[30] Foreign Application Priority Data

Aug. 12, 1986 [DE] Fed. Rep. of Germany ....... 3627332
Jan. 9, 1987 [DE] Fed. Rep. of Germany ....... 3700532
Jan. 19, 1987 [DE] Fed. Rep. of Germany ....... 3701366

[51] Int. Cl.$^4$ ............................................. A23L 1/025
[52] U.S. Cl. ........................................ 426/506; 99/516; 126/20; 126/369; 366/101; 426/281; 426/523
[58] Field of Search ................ 426/506, 281, 510, 523, 426/511; 99/348, 516; 126/20, 369; 219/401; 366/101

[56] References Cited

U.S. PATENT DOCUMENTS

| | | | |
|---|---|---|---|
| Re. 28,292 | 1/1975 | Piper et al. .................. | 62/64 |
| 1,256,955 | 2/1918 | Trescott ....................... | 426/506 |
| 3,744,474 | 7/1973 | Shaw ........................... | 126/20 |
| 3,814,901 | 6/1974 | Morhack ...................... | 219/401 |
| 4,039,776 | 8/1977 | Roderick ...................... | 219/401 |
| 4,173,215 | 11/1979 | Bureau et al. ................ | 99/468 |
| 4,189,995 | 2/1980 | Löhr et al. ................... | 426/524 |
| 4,202,259 | 5/1980 | Johansson .................... | 99/447 |
| 4,303,687 | 12/1981 | Ratjen ......................... | 426/497 |
| 4,452,132 | 6/1984 | Miller et al. ................. | 99/483 |
| 4,506,598 | 3/1985 | Meister ........................ | 426/523 |
| 4,534,987 | 8/1985 | Holman et al. .............. | 426/523 |
| 4,700,685 | 10/1987 | Miller .......................... | 426/523 |
| 4,701,334 | 10/1987 | Durth .......................... | 426/523 |
| 4,701,340 | 10/1987 | Bratton et al. ............... | 426/523 |
| 4,731,251 | 3/1988 | Jovanovic .................... | 426/243 |

FOREIGN PATENT DOCUMENTS

| | | |
|---|---|---|
| 0595461 | 4/1960 | Canada .................. 426/523 |
| 0251947 | 1/1988 | European Pat. Off. . |
| 2492223 | 4/1982 | France . |
| 1142650 | 2/1969 | United Kingdom . |

OTHER PUBLICATIONS

Stein, "The Random House College Dictionary", the unabridged edition.

Primary Examiner—Virginia Manoharan
Attorney, Agent, or Firm—Felfe & Lynch

[57] ABSTRACT

A process for reheating and/or complete cooking and baking of food-stuffs, especially of cooking, baking or grilling products, wherein a mixture of heated air and water vapor is introduced directly into the interior of the food-stuff before and/or during the heating procedure.

8 Claims, 3 Drawing Sheets

METHOD FOR REHEATING OR COOKING FOODS USING A MIXTURE OF HEATED AIR AND WATER

The present invention is concerned with a process and a device for reheating and complete cooking and baking of foodstuffs, especially of cooking, baking and grilling products.

Foodstuffs and especially cooking products, baking products and meat products lose moisture upon heating. This gives rise to problems especially when cooking, baking and grilling products are heated a second time or half prepared products are completely cooked or baked. After the second heating or after complete cooking or baking, the foodstuffs are drier than the freshly prepared foodstuffs and they suffer from a loss of quality. The loss of moisture and thus the loss of quality is the greater, the longer is the heating of the foodstuffs. Thus, for example, in the case of recooking frozen foodstuffs, the loss of moisture is very high since these, depending upon the size, require a heating time of 30 minutes or more. Since the heating usually takes place from the outside, the surface of the product to be heated suffers from the greatest loss of moisture. Furthermore, since the heat is only applied from the outside, the middle of the foodstuff is only heated very slowly, which results in cooking and baking times which are too long. In addition, the pores of the cooked or baked products become smaller due to drying out even after heating for only about 5 minutes. This results in a diminution of volume. Furthermore, reheated cooked or baked products very quickly become overdone.

Since especially foodstuffs which have been frozen require long cooking or baking times and, therefore, dry out very considerably, for overcoming this problem it has already been suggested to supply moisture in the form of water to the foodstuffs before freezing. Thus, for example, a process is known from Federal Republic of Germany Patent Specification No. 28 56 272 in which water or water vapor is injected before the deep freezing process. However, it is a disadvantage of this process that, already in the thawing out, moisture escapes and then, in the case of cooking or baking, about the same state is achieved as in the case of the previously known processes. The heating time is also just as long as in the case of the otherwise usual processes.

It is an object of the present invention to provide a process and a device with which it is possible rapidly again to reheat or completely cook or bake foodstuffs without the above-mentioned loss of quality occurring.

A further object of the present invention is to provide a device with which, with little trouble, a relatively small amount of water vapor is needed in order to cook or bake foodstuffs.

Yet a further object of the present invention is to provide a simple device which is suitable for conventional ranges and ovens.

Thus, according to the present invention, there is provided a process for reheating and/or complete cooking and baking of foodstuffs, especially of cooking, baking or grilling products, wherein a mixture of hot air and water is introduced directly into the interior of the foodstuff before and/or during the heating procedure.

The process according to the present invention makes it possible very rapidly to heat and completely to cook or bake foodstuffs. Due to the short heating time, the loss of moisture is reduced. At the same time, the loss of moisture which would occur during cooking or baking is compensated for by the introducing of a corresponding amount of water in the form of a mixture of hot air and water vapor. Surprisingly, with the process according to the present invention, it is possible to heat up and to cook or bake foodstuffs so that the quality thereof corresponds to that of freshly prepared foodstuffs. In particular, according to the reheating, cooking or baking process of the present invention, cooked and baked products do not become overdone so quickly as is the case with conventional processes. Furthermore, the heating up time is very considerably shortened to a fraction of the time needed for the conventional processes. Depending upon the size of the foodstuff, the heating time is reduced from one tenth to one half of the time previously needed. In this way, energy costs are also saved. In a preferred embodiment of the present invention, it is possible to heat foodstuffs with little expense. It is thereby possible to inject a relatively small amount of water vapor, mixed with hot air, continuously into the foodstuff, the ratio of water vapor to air being easily adjustable according to requirements.

The process according to the present invention is suitable for all foodstuffs which, for consumption, must be reheated or completely cooked or baked, the process being especially suitable for cooking, baking and grilling products. Examples of baked products include bread, rolls and other small baked products and as grilled products especially sausages and pieces of meat suitable for grilling, for example chicken, hamburgers and baked products filled with meat. The process can be used not only for recooking and rebaking products which have already been cooked, baked or grilled but also for completely cooking or baking foodstuffs which have been half cooked or half baked. The foodstuff to be treated can also be in a frozen or thawed state.

For carrying out the process according to the present invention, a mixture of hot air and water vapor, which can also be called cooking steam, is introduced directly into the interior of the foodstuff to be treated before or during the heating procedure.

For this purpose, one or more tubes are preferably introduced into the foodstuff via which the cooking steam can be blown in. The injection of the cooking steam can take place before the heating up or the cooking or baking in known manner. This embodiment is especially suitable for small baked products. Furthermore, the injection can also take place during the heating up so that the heating up takes place simultaneously on the inside and outside. This is especially preferred in the case of comparatively large foodstuffs. One possibility is to blow in the cooking steam first directly before the heating up in the form of a steam jet and then to supply a further amount of moisture during the heating up process. The appropriate form of application depends upon the nature and the size of the foodstuff to be heated up.

According to a preferred embodiment, the process according to the present invention is carried out in such a manner that the mixture of hot air and water vapor is first introduced into the foodstuff in the form of a steam jet and the material so treated is subsequently immediately heated up in a baking oven.

In another embodiment, the cooking steam is blown into the foodstuff, before heating up, via nozzles with the use of pressure.

The amount of water vapor introduced into the foodstuff depends upon the amount of moisture which the foodstuff loses upon heating. Such an amount of water is introduced into the foodstuff as would be lost in the case of heating under the same conditions but without the introduction of water.

The amount of water vapor introduced preferably amounts to 0.5 to 5% of water, referred to the weight of the foodstuff to be heated up, 1 to 3% of water more preferably being introduced. The amount which is optimal in any particular case depends upon the nature of the foodstuff and can easily be determined by a few trials.

Very good results are obtained when the interior of the foodstuff is not only supplied with the amount of water vapor which is lost during heating but when, during the heating procedure, the foodstuff is also exposed during the heating in the oven to air enriched with moisture.

The present invention also provides a device for the production of cooking or baking steam, wherein it comprises a steam producer to which is attached an injection device by means of which steam can be introduced into the interior of a foodstuff.

With the device according to the present invention, there is produced a mixture of hot air and water vapor which is referred to as baking or cooking steam. This steam can then be introduced into the foodstuff to be treated by means of the injection device.

In a preferred embodiment of the device according to the present invention, the injection device is arranged in the baking chamber of an oven. Therefore, the present invention also provides a device for the reheating and/or complete cooking or baking of foodstuffs, comprising a cooking or baking oven into the chamber of which can be introduced steam from a steam producer, wherein the steam producer has an injection device arranged in the cooking or baking chamber by means of which the steam can be introduced into the interior of a foodstuff.

In the case of this preferred embodiment, the device according to the present invention comprises a known oven in which foodstuffs can be heated up in known manner in a temperature range of from 0 to 400° C. Heating can take place, for example, by a hot air blower, microwaves, infra-red waves or other forms of radiation heat. The temperature can be controlled in known manner. The baking or cooking chamber can be divided up by one or more baking or grilling trays. The oven is connected with a steam-producing device for the production of a mixture of hot air and water vapor. As steam producer there can be used any device which provides a mixture of hot air and water vapor.

The steam producer is preferably constructed as a continuous flow heater for water and includes a blower for introducing air into the water-heating cycle. The continuous flow heater is supplied from a water container. In the water inlet pipe of the continuous flow heater there is preferably provided a metering device and especially a metering pump with the help of which the required amount of water can be adjusted.

For reasons of energy saving, it is especially preferred to suck out from the baking or cooking chamber the hot air which is introduced via the blower into the water-heating cycle of the continuous flow heater for the production of the steam. Furthermore, an injection device is present on the steam producer.

In another preferred embodiment, a device for reheating and/or complete cooking or baking of foodstuffs comprises an oven into the chamber of which can be introduced steam from a steam producer, the steam producer comprising a preheater, which produces steam, and an after-heater constructed as a mixing chamber which increases the air content of the steam. The steam produced in the preheater is preferably introduced into the mixing chamber via a nozzle. The preheater is preferably constructed as a continuous flow heater and is supplied from a water container. In the water inlet pipe of the continuous flow heater there is preferably provided a metering device and especially a metering pump with the help of which the required amount of water can be adjusted. The amount of water vapor is adjusted to the amount which is to be introduced into the foodstuff.

The after-heater constructed as a mixing chamber can have any suitable form. However, it is preferably also in the form of a continuous flow heater. The mixing chamber is preferably constructed as a tube into which opens the nozzle conducting steam from the preheater. In an especially preferred embodiment, the mixing chamber is a curved tube which is heated from the outside.

The mixing chamber is preferably so constructed that it forms a dammed chamber so that the steam introduced impulse-like into the after-heater constructed as a mixing chamber leaves the after-heater continuously with the air component. For this purpose, a throttle is preferably present in the tube downstream of the direction of flow of the steam.

Furthermore, on the end of the after-heater facing the nozzle there is provided an air inlet path which is preferably constructed as a pipe or in the form of a tube. If the mixing chamber is constructed as a tube, the air inlet path is preferably an elongation of the after-heater tube. A non-return valve is preferably provided in the air inlet path before the nozzle. The steam from the preheater flows through the nozzle, which has a small cross-section, into the after-heater, the cross-section of which is larger and which is preferably constructed as a tube. As in the case of a waterpump, an underpressure thereby results by means of which air is sucked in via the air inlet path. The air inlet path preferably terminates in the oven so that the air drawn in is warm and essentially cannot condense any water.

For the regulation of the air admission, a control element is preferably provided in the air inlet path. In another preferred embodiment, the air inlet path is attached to a blower or a compressor which meters the warm air sucked from the oven and passes it into the air inlet path.

Furthermore, on to the after-heater is attached an injection device by means of which the steam can be introduced into the interior of a foodstuff.

The injection device present on the steam producer according to the present invention, by means of which the steam can be introduced into the interior of a foodstuff, is so constructed that it can be introduced into a foodstuff. For this purpose, there can be used tubes which have one or more openings. The openings are preferably distributed over the surface of the tube. It is especially preferred for the surface openings to be distributed in the circumferential and longitudinal direction. The injection device can consist of one or more tubes, the tubes optionally being assembled into groups.

When the injection device comprises a group of tubes, it is desirable that, in each case, the number of tubes supplied with steam is precisely that which is needed. Therefore, when the injection device comprises several tubes, at least one is connected to the steam producer via a regulating valve. Furthermore, several groups of tubes can, in each case, be regulatable by means of valves and connected with the steam producer in order to use the number of tubes which is optimal for the practical purpose.

In a preferred embodiment, the injection device has a collecting pipe in the form of an annular tube or of a double-plate channel. Two or more tubes then pass from this collecting pipe. The tubes are thereby preferably vertical to the collecting pipe. In the case of this preferred injection device, either on to each tube there can be placed a piece of foodstuff or, if the piece of foodstuff is large, several tubes can be inserted into it. This embodiment is especially suitable for griddle cooking.

Since it is desirable for the foodstuff to be externally surrounded by moist air during the heating procedure, a pipe can also be connected to the steam producer which opens into the cooking chamber parallel to the injection device. In order to regulate the amount of steam which is introduced via the injection device or via the cooking chamber pipe, a regulating valve is provided either in the cooking chamber pipe or in the pipe which leads to the injection device. The steam can be so regulated by the regulating valve or valves that, before the heating procedure, the steam is passed to the foodstuff and during the heating procedure is then passed into the cooking chamber. It is also possible to pass the steam into the foodstuff or also into the cooking chamber during the heating procedure.

The number of tubes used depends upon the size of the foodstuff to be heated. For small bakery articles and for comparatively small pieces to be grilled, one tube suffices, whereas for larger products it is advantageous to use several tubes. Since the foodstuff is also heated internally by the introduction of the hot steam, considerably shorter heating times are needed than in the case of conventional procedures. This has the advantage that energy is saved and, on the other hand, a negative influencing of the quality during the heating procedure is reduced. Since, in addition, the loss of water during the heating is compensated for by the injection of steam, with the process and device according to the present invention there are obtained foodstuffs of excellent quality. With the process according to the present invention, small bakery articles can be baked within 2 to 3 minutes. The process and the device of the present invention are also outstandingly useful for meat and baked articles filled with meat. Thus, for example, fast food articles, such as hamburgers, can be cooked quickly without a loss of quality.

In another preferred embodiment of the device according to the present invention for reheating and complete baking or cooking of foodstuffs, the steam producer is constructed as a vessel which can be closed with a lid, the inside of which is connected to a vertically standing tube on the vessel. In this embodiment, the steam producer includes a vessel which can be closed with a cover. The vessel serves for the reception of water and the cover closes the vessel relatively tightly. For this purpose, a seal is preferably provided between the cover and the vessel.

The vessel is preferably so constructed that the diameter of the bottom of the vessel is a multiple and preferably 2 to 10 times the height of the interior of the vessel. When the vessel is filled with water and exposed to a source of heat, then, because of the large surface area which is in contact with the bottom of the vessel, the contents of the vessel heat up especially quickly. In this way, time and energy for the cooking or baking can be saved.

The cover of the vessel preferably has an inner dome so that the air space formed over the interior of the vessel part is enlarged. In this way, the steam formed by heating the water forms a mixture with the air present. Such a steam mixture is especially preferred for heating foodstuffs. Furthermore, with this embodiment an optimum filling height can be provided and, nevertheless, sufficient air is still available in the vessel.

The interior of the vessel is connected with an injection device made as a tube. This tube is attached to the vessel and stands upward. The tube serves to introduce the steam produced in the vessel into he foodstuff to be treated. The tube is preferably fixed to the cover part. The tube has one or more openings, these openings preferably being distributed over the surface of the tube. It is especially preferred for these openings on the surface to be distributed in a circumferential and longitudinal direction. The device according to the present invention serves for the production of steam. Upon heating the water contained in the vessel, steam is formed which can escape through the tube. Depending upon the period of time, the escaping water vapor can contain more or less large amounts of air.

The foodstuff to be treated is placed on the tube and heated by the steam. The amount of water vapor which is introduced into the foodstuff depends upon the amount of moisture which the foodstuff loses upon heating. Such an amount of water is supplied to the foodstuff as would be lost in the case of heating under the same conditions but without the supply of water. The amount of water vapor introduced preferably amounts to 0.5 to 5% of water, referred to the weight of the foodstuff to be heated. 1 to 3% of water is especially preferred. The amount which is optimal for any particular case depends upon the nature of the foodstuff and can easily be determined by a few preliminary trials.

The amount of water which is introduced into the foodstuff is regulated via the amount of water in the container and via the cooking or baking time.

The heat necessary for the steam production can be supplied to the vessel directly or indirectly. The necessary heat can be provided to the cooking or baking apparatus for example by a hot air blower, microwaves, infra-red waves or other heat radiations. The vessel is preferably heated in a baking oven or on a hotplate. If the heating takes place on a hotplate, the vessel is preferably also covered with a hood. The heating takes place especially preferably in a baking or cooking oven since the foodstuff is then heated by the steam produced not only externally but also internally and the heating time can thereby be kept very short, which provides products of high quality. The device according to the present invention can be used in all conventional baking and cooking ovens and on conventional cooking and baking plates.

In order to heat up several small bakery products rapidly and simultaneously or to heat up comparatively large bakery products rapidly, several vessels can be assembled together and held together in a frame, several vessels preferably being held together by one frame. For this purpose, several vessels are assembled on a baking plate or on a baking dish.

The cover of the vessel preferably has flanges at a distance from the tubes which serve to carry the foodstuff so that it does not lie on the cover.

The vessel is filled with water and closed with the cover. It is then heated in a baking or cooking oven or on a cooking plate or by some other suitable heating means. Since the container is closed, the steam formed escapes through the tube on which is placed the foodstuff. At the beginning, the steam entrains the air contained in the container and, in the course of time, the content of water vapor increases and that of air decreases.

According to the present invention, there is provided an apparatus which enables foodstuffs to be heated without great expense. By means of the device according to the present invention, small bakery articles can be baked within the course of 2 to 3 minutes. The device is especially suitable for bakery products which have been frozen, for example rolls, cakes and the like, and for half-baked bakery products, such as half-finished white bread. The device according to the present invention is also outstandingly suitable for meat and baked articles filled with meat. Thus, for example, fast food articles, such as hamburgers, can be cooked quickly and without loss of quality.

BRIEF DESCRIPTION OF THE DRAWINGS

The accompanying drawings illustrate preferred embodiments of the device according to the present invention. In these drawings:

FIG. 1 shows a baking oven 1 with a baking chamber 2 which can be heated in conventional manner, the temperature of which can be regulated in the range of from 0 to 400° C. In the baking chamber 2 is provided a grill plate 4. A steam producer 6 is connected to the baking oven 1. This steam producer comprises a water container 8 which is connected with a continuous flow heater 10 for the production of water vapor via a water pipe 12. In the water pipe 12 there is provided a metering pump 14 for the regulation of the particular amount of water required. Into the continuous flow heater 10 there also opens a blower 16 which provides the amount of air for the mixture. The blower 16 draws in air from the baking chamber 2 via a pipe 17.

Figure 1:
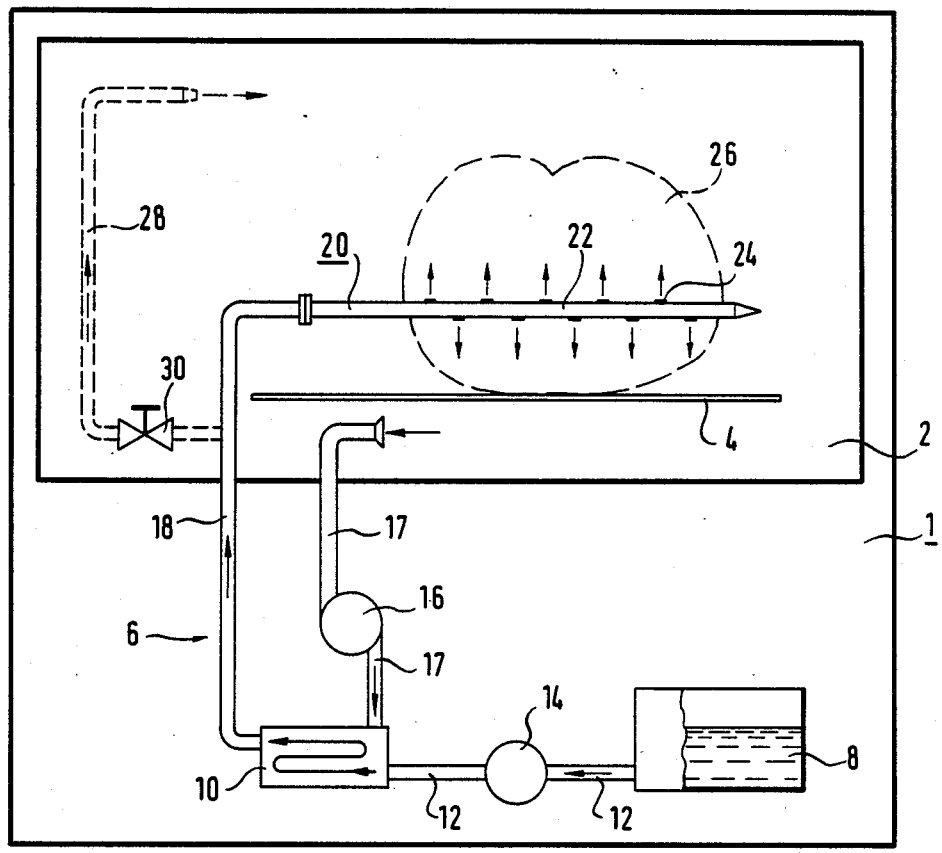
FIG. 1 is a schematic illustration of a device for reheating and/or complete cooking or baking of foodstuffs.

The mixture of hot air and water vapor produced in the steam producer is passed via a steam pipe 18 into an injection device 20. The injection device 20 consists of a tube 22 with surface openings 24 distributed over its circumference and in a longitudinal direction. An article of food, such as a roll 26, is stuck on to this tube 22.

Water vapor is produced in the continuous flow heater 10 which is mixed with air by means of a blower 16. The steam thus produced is guided via the steam pipe 18 and the injection device 20. The steam passes out of the surface openings 24 of the tube 22 and is introduced into the foodstuff stuck on to the injection device 20. At the same time, the foodstuff in the baking chamber is heated on the outside.

The embodiment shown in FIG. 1 is a steam producer 6 with injection device 20 which can be used in a baking oven. The device shown in FIG. 1 for the production of steam can also comprise an additional pipe 28 (shown in broken lines) parallel to the injection device 20 which passes steam into the baking chamber 2. A regulating valve 30 is provided in the pipe 28 for the regulation of the amount of steam.

The foodstuff is provided internally via the tube with steam. At the same time, during the heating procedure in the baking chamber of the oven, moist air is introduced in the baking chamber via the baking chamber pipe. In this way, the loss of moisture is kept to a minimum and, at the same time, the water evaporating to the outside is replaced by the moisture introduced into the interior. The foodstuff heated in this way has, after reheating, a quality which corresponds to that of freshly prepared foodstuffs. Furthermore, the heating procedure is very considerably shortened.

Figure 2:
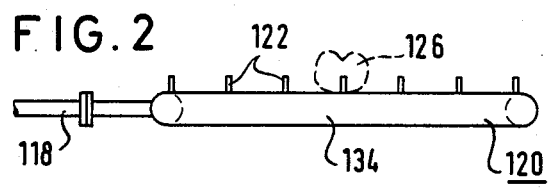
FIG. 2 is a side view of a schematic illustration of an injection device formed as an annular pipe.

FIG. 2 shows a preferred embodiment of the injection device illustrated in FIG. 1. Parts with the same function are given the same reference numerals as in FIG. 1 but increased by the figure of 100. The injection device 120 is here constructed as a collection pipe which has the shape of an annular pipe 134. Tubes 122 stand vertically from the annular pipe 134. A foodstuff can then be stuck on to these vertically standing tubes 122.

Figure 3:
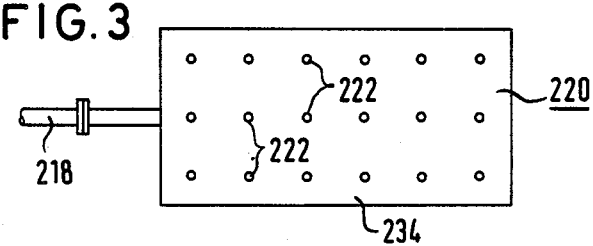
FIG. 3 is a plan view of a schematic illustration of an injection device formed as double-plate channel.

FIG. 3 shows a further embodiment of the injection device of FIG. 1. Parts with the same function are here given the same reference numerals as in FIG. 1 but increased by the figure of 200. The injection device 220 is here constructed as a collection pipe in the form of a double plate channel 234, from which several tubes 222 project vertically. This embodiment is especially suitable for larger pieces of foodstuffs which can be stuck on to several tubes 222.

Figure 4:
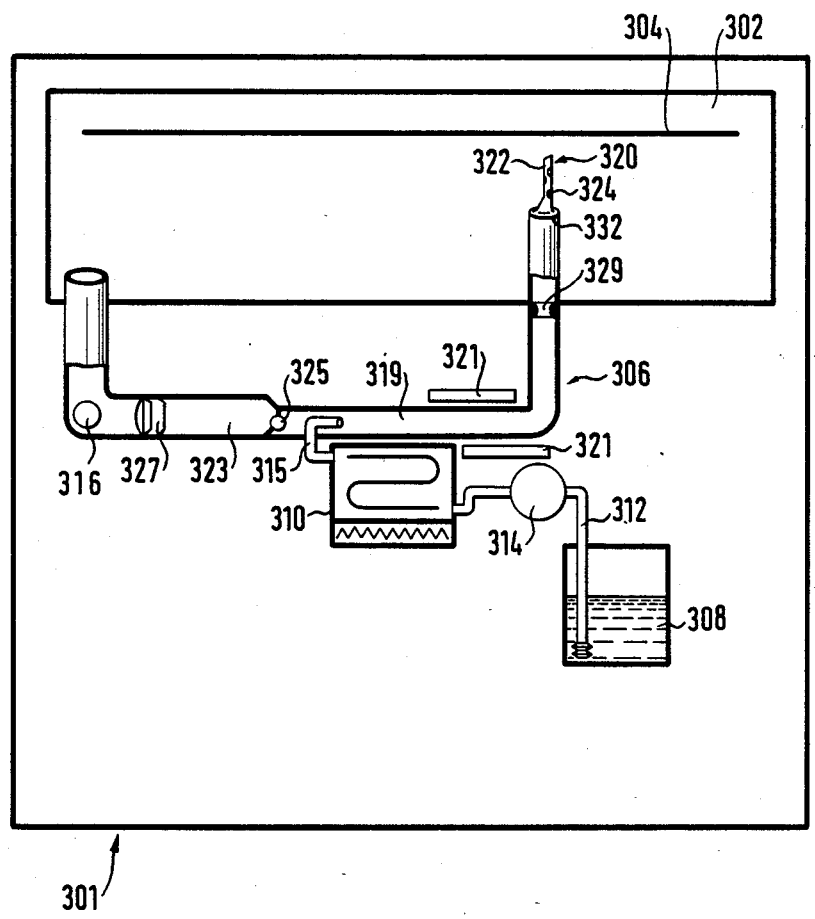
FIG. 4 is a schematic illustration of a device for reheating and/or complete cooking or baking of foodstuffs.

FIG. 4 shows another embodiment of a steam producer. Here again, parts with the same function are given the same reference numerals as in FIG. 1 but increased by the figure of 300. FIG. 4 shows a baking oven 301 with a baking chamber 302 which can be heated in conventional manner, the temperature of which can be regulated in the range of from 0 to 400° C. In the baking chamber 302 there is provided a rack 304. A steam producer 306 is connected with the baking chamber 302. This steam producer 306 comprises a water container 308 which is connected with a preheater for the production of steam via a water pipe 312. In the water pipe 312 is provided a metering pump 314 for the regulation of the particular amount of water needed. With the continuous flow heater 310 is connected a nozzle 315 which sprays the vapor-produced in the preheater 310 into an after-heater 319. The after-heater 319, which is heated via heating means 321, is connected with an air inlet 323 via a non-return valve 325. The air inlet path 323 is connected to a blower 316. The blower 316 can also be replaced by a compressor. On the air inlet path 323 is provided a regulating member 327 for the regulation of the particular amount of air required. On the end of the after-heater 319 remote from the nozzle 315 there is provided a throttle 329. The end 332 of the after-heater 319 remote from the nozzle is connected with an injection device 320. The injection device 320 consists of a tube 322 with surface openings 324 distributed over the circumference and in the longitudinal direction.

In the continuous flow heater 310 there is produced water vapor which is passed through the nozzle 315 into the after-heater 319. Due to the under-pressure resulting by the spraying in of the water vapor, hot air is drawn into the after-heater 319 via the non-return valve 325 and the air inlet 323 and mixed with the vapor. The after-heater 319 is constructed as a mixing chamber and forms a dammed chamber by means of the throttle 329 so that the after-heater 319 gives off the vapor-air mixture uniformly via the injection device 320, although the vapor escapes pulse-like from the preheater.

Figure 5:
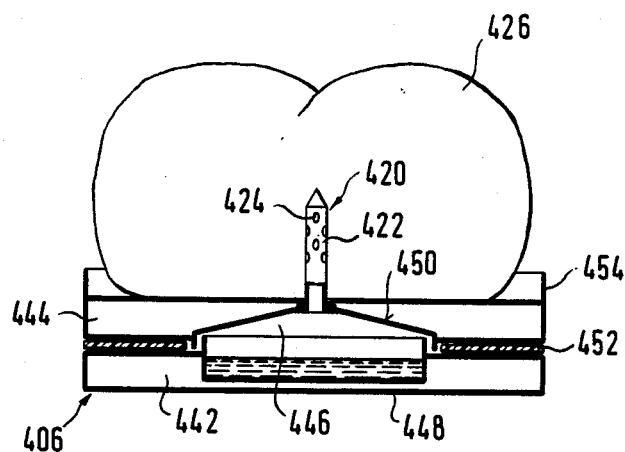
FIG. 5 is a schematic illustration of a device according to the present invention.

FIG. 5 shows an especially simple embodiment of the device according to the present invention for the production of steam. Here, too, parts with the same function are given the same reference numbers as in FIG. 1 but increased by the figure of 400. The steam producer 406 consists of a vessel 442 which can be closed with a cover 444. The height of the inner chamber 446 is about one fifth of the diameter of the vessel bottom 448. The inner chamber 446 of the vessel 442 is connected with an injection device constructed as a tube 422. The tube 422 is fixed to the cover part 444. The cover part 444 has an inner dome 450. The tube 422 has surface openings 424 distributed over the circumference and in the longitudinal direction. Between the cover 444 and the vessel 442 is provided a seal 452. On the cover 444 are provided flanges which hold the foodstuff 426 to be treated. The inner chamber 446 of the vessel 442 is filled with water. When the device is heated, the water in the vessel 442 begins to boil and the resulting vapor escapes through the tube 422 and heats from the inside the foodstuff 426 stuck on the tube.

Figure 6:
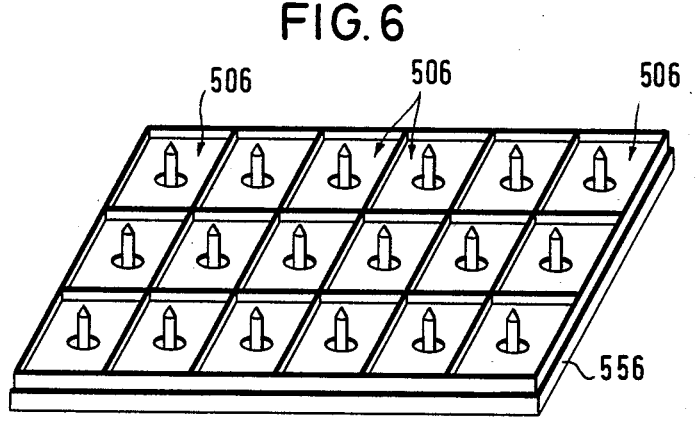
FIG. 6 is a system of several devices according to the present invention which are assembled in a baking plate.

FIG. 6 shows a combination of several steam producers according to FIG. 5. FIG. 6 shows a baking plate 556 which holds together a plurality of devices 506 according to the present invention. Comparatively large foodstuffs or a number of small bakery products can be stuck on to this composite system.

I claim:

1. A method for reheating or completing the cooking or baking of a foodstuff comprising introducing a mixture of heated air and water vapor directly into the interior of the foodstuff before the reheating, cooking or baking of the foodstuff so as to reduce time needed to reheat, completely cook or completely bake said foodstuff.

2. The method of claim 1, wherein the mixture of heated air and water vapor is directed onto the external surface of the foodstuff simultaneously with the introduction of the heated air and water vapor mixture to the interior of the foodstuff.

3. The method of claim 1 or 2, wherein the ratio of water vapor to heated air is adjusted so that as much water vapor is supplied to the interior of the foodstuff as is lost by the reheating.

4. The method of claim 1 or 2, wherein the mixture of heated air and water vapor is blown into the foodstuff under pressure via nozzles.

5. The method of claim 1 wherein a mixture of heated air and water vapor is directed onto the external surfaces of the foodstuff after the introduction of the heated air and water vapor mixture to the interior of the foodstuff.

6. The method of claims 1, 2 or 5 wherein 0.5 to 5% of water is introduced into the foodstuff referred to the weight of the foodstuff to be reheated, completely cooked or completely baked.

7. The method of claims 1, 2 or 5, wherein the mixture of heated air and water vapor is supplied to the foodstuff in the form of a steam jet and the foodstuff is subsequently reheated, completely cooked or completely baked.

8. A method for reheating or completing the cooking or baking of foodstuff comprising introducing a mixture of heated air and water vapor directly into the interior of the foodstuff during the reheating, cooking or baking thereof thereby reducing the time needed for reheating or complete cooking by one tenth to one half and introducing 0.5 to 5% of water into the foodstuff.

* * * * *